Figure 1:
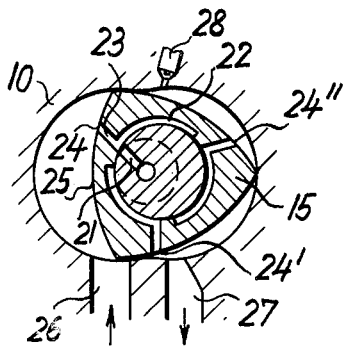

June 14, 1966      F. K. H. NALLINGER      3,255,737

ROTARY PISTON INJECTION ENGINE

Filed Dec. 28, 1962

INVENTOR
Friedrich K. H. Nallinger

BY Dicke & Craig

ATTORNEYS 3,255,737
ROTARY PISTON INJECTION ENGINE
Friedrich K. H. Nallinger, Stuttgart, Germany, assignor to Daimler-Benz Aktiengesellschaft, Stuttgart-Unterturkheim, Germany
Filed Dec. 28, 1962, Ser. No. 248,152
Claims priority, application Germany, Jan. 4, 1962, D 37,845
5 Claims. (Cl. 123—8)

The present invention relates to a rotary piston fuel-injection engine, in which the inner surface of the body of the surrounding housing has a trochoidal shape. Contrary to the conventional internal combustion engines with reciprocating pistons, these rotary piston engines have a work chamber which moves with the piston in the direction of its rotation and functions successively as an intake chamber, compression chamber, combustion chamber, and exhaust chamber. Because of the inertia of the injected fuel particles which are not as yet sufficiently vaporized, the fuel which is injected from the outside, that is, from the surrounding body of the housing, lags relative to the forwardly moving volume of combustion air, and then has to be pushed along by the edge of the piston which slides along the inner wall of the housing. The result is an uneven fuel distribution since at the time of the ignition of the fuel, there is a considerably greater quantity of fuel in the rear part of the work chamber than in its front part, as seen in the direction of rotation of the piston. This is very undesirable for a diesel-type combustion with compression ignition in which it results in a smoke formation and especially also for a combustion in a spark-ignition engine in which the air-fuel mixture on the spark plug may then be too lean.

It is an object of the present invention to overcome these disadvantages by injecting the fuel into the respective work chamber from the particular surface of the piston which defines this particular work chamber. The individual fuel particles are then propelled immediately at the same peripheral speed component as the forwardly moving volume of air, and furthermore these fuel particles are continuously supplied during the injection period to more forwardly disposed points in the work chamber. By the novel manner of injecting the fuel into the work chamber, a fuel fog is formed therein which revolves with the piston and thus also with the work chamber. The distribution of the fuel is thus much more homogeneous at the time when the ignition takes place than if the fuel is injected from the stationary housing.

Since even with a fuel injection according to the invention it must be assumed that in most cases a slight lagging of the fuel particles will occur in the peripheral direction, the invention further provides that the points of injection of the fuel, for example, the injection nozzles, should be placed in the front part of the piston surfaces, as seen in the direction of rotation.

In an engine which is provided with a piston which carries out a rotary movement about an eccentric, the fuel may be supplied to the piston through channels in the shaft and the eccentric thereon. If the number of edges on the piston is $n$ and the number of piston surfaces, each of which successively forms a part of the walls of the work chamber is therefore likewise $n$, it would normally be necessary also to provide $n$ fuel supply lines from the fuel pump to the respective point of injection. However, according to another feature of the invention, this may be simplified by feeding the fuel to the individual piston surfaces through only one fuel channel in the shaft and in the eccentric thereon which ends on the peripheral surface of the eccentric and which, because of the relative movement between the eccentric and the piston communicates with the respective channel in the piston which leads to the point of injection, for example, to the injection nozzle, in the particular piston surface which at that time forms a part of the walls of the work chamber. In order to insure that the injection will then take place for a period of time of a sufficient length, it is advisable to provide one or both of the adjacent surfaces of the eccentric and of the piston with peripherally extending grooves of a length equal to a certain sector angle, so that at least one of the two channels in the eccentric and in the piston will terminate into such a groove or grooves.

Figure 2:
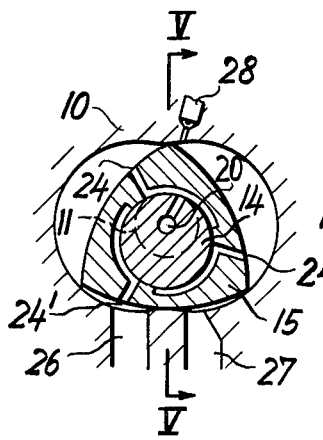
Figure 5:
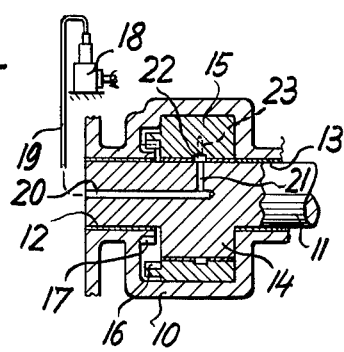

The features and advantages of the present invention will become more clearly apparent from the following detailed description thereof which is to be read with reference to the accompanying drawings, in which:

FIGURES 1 to 4 show diagrammatic cross sections of an engine according to the invention in four different positions spaced at quarter-turns of one revolution of the eccentric shaft of this engine from each other; while FIGURE 5 shows a vertical section taken along the line V—V in FIGURE 2.

As illustrated in the drawings, the shaft 11 of the engine is rotatably mounted in bearings 12 and 13 within a fixed housing 10 of an epitrochoidal shape. Shaft 11 carries integrally secured thereto an eccentric 14 on which a piston 15 is rotatably mounted which has a substantially equilaterally triangular cross section with rounded sides. The relative movement between piston 15 and the enclosing body of housing 10 is determined by a pair of gears which consists of a set of internal gear teeth 16 which is secured to the piston 15 and is disposed concentrically to the center of the eccentric 14 and of a set of external gear teeth 17 which is secured to the housing 10 and is disposed concentrically to the axis of shaft 11. The engine is further provided with an intake channel 26, an exhaust channel 27, and a spark plug 28. The principles of operation of such an engine are generally known in the art and therefore do not need to be described in detail.

The eccentric shaft 11 which also forms the driven shaft of the engine is connected to a fuel injection pump 18 so as to drive the same in a manner so that once during each revolution of shaft 11 the injection pump 18 will force fuel into a line 19. This fuel then passes in a conventional manner to a central longitudinal channel 20 in shaft 11 and then through a radial channel 21 to the peripheral surface of the eccentric 14. Piston 15 contains grooves 22 and channels 23 through which the fuel is further conducted to the points of injection 24, 24', or 24" on the outer surfaces 25 of piston 15. These points of injection are usually provided with injection nozzles.

Figure 3:
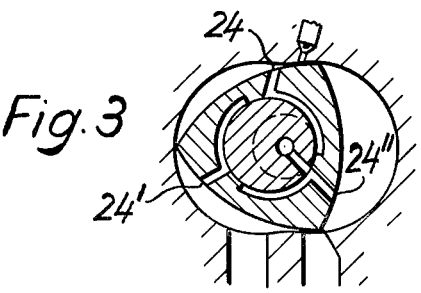
Figure 4:
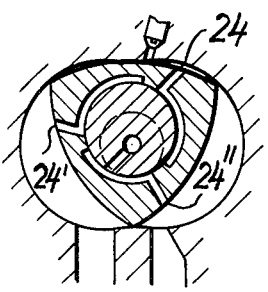

When shaft 11 and piston 15 are turned to the position as illustrated in FIGURE 1, the fuel injection may start and last until the shaft and piston have turned beyond the position according to FIGURE 2 and reach a position shortly preceding the position according to FIGURE 3. In this position according to FIGURE 3, however, pump 18 should stop the delivery of fuel since it would otherwise be injected at 24" into the "exhaust stroke." When the eccentric shaft 11 against reaches the position according to FIGURE 1, that is, when it has turned 360° about its axis, piston 15 has carried out a turn of only 120°. The injection point 24' is then located at the point where previously the injection point 24 was located, whereupon the next fuel injection can take place.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. A rotary piston fuel-injection engine comprising a stationary housing having an inner surface of a trochoidal shape, a rotary piston of an angular cross section rotatable within and completely enclosed by said housing, the outer surface of said piston together with a part of the inner surface of said housing defining a work chamber which during the rotation of said piston successively functions as an intake chamber, as a compression chamber, as a combustion chamber, and as an exhaust chamber, said piston being provided with fuel supply channels, each channel having a generally radially extending portion terminating in a well-defined aperture within the outer surface of the piston nearer the leading piston corner as viewed in the normal direction of rotation of the piston, and means including said channels for injecting fuel into said work chamber exclusively through the generally radially extending channel portions and corresponding apertures provided in said piston whereby the individual fuel particles are propelled immediately at the same peripheral speed component as the forwardly moving volume of air and the fuel particles are continuously supplied during the injection period to more forwardly disposed points in the work chamber.

2. A rotary piston fuel-injection engine comprising a housing having an inner surface of a trochoidal shape, a shaft rotatably mounted in said housing and having an eccentric thereon, a rotary piston of an angular cross section rotatable on and relative to said eccentric within and completely surrounded by said housing, said piston having a plurality of outer surfaces, each together with a part of the inner surface of said housing defining a work chamber which during the eccentric rotation of said piston successively functions as an intake chamber, as a compression chamber, as a combustion chamber, and as an exhaust chamber, means for rotating said piston at a lower rate of speed than said shaft, communicating channel means in said shaft and said eccentric, channel means in said piston adapted to communicate periodically with said first channel means and terminating into at least one aperture in each of said outer surfaces of said piston, and means for injecting fuel through said channel means and from said aperture into said work chamber.

3. A rotary piston fuel-injection engine as defined in claim 2, in which said channel means in said shaft and said eccentric forms a single channel terminating into an aperture in the peripheral surface of said eccentric, said channel means in said piston comprising a plurality of channels, each adapted to communicate in turn with the last-mentioned aperture during the relative rotation between said eccentric and said piston to supply fuel into said work chamber when functioning as an intake chamber.

4. A rotary piston fuel-injection engine as defined in claim 3, in which a groove is provided in at least one of the adjacent surfaces of said eccentric and said piston and extending in the peripheral direction thereof and having a length equal to a certain sector angle.

5. A rotary piston fuel-injection engine, comprising a housing having an inner surface of a trochoidal shape, a rotary piston of an angular cross section rotatable within and completely enclosed by said housing, the outer surface of said piston together with a part of the inner surface of said housing defining a work chamber which, during the rotation of said piston, successively functions as an intake chamber, as a compression chamber, as a combustion chamber, and as an exhaust chamber, said piston being provided with fuel supply channels terminating in well-defined apertures within the outer surface of the piston with the cross section of the aperture being at least of the same order as the cross section of a corresponding channel, and means for injecting fuel through said piston and from at least one said aperture in said outer surface thereof into said work chamber, said fuel-injecting aperture being provided exclusively in a part of the outer surface of said piston which, when said work chamber functions as an intake chamber, is located in the front part of said chamber as seen in the direction of rotation of said piston.

References Cited by the Examiner

UNITED STATES PATENTS

| | | |
|---|---|---|
| 813,018 | 2/1906 | Okun. |
| 2,027,972 | 1/1936 | Haller et al. |
| 2,156,304 | 5/1939 | Phillips. |
| 2,283,433 | 5/1942 | Gross. |
| 2,462,854 | 3/1949 | Gates _____ 123—32 |
| 2,988,065 | 6/1961 | Wankel et al. _____ 123—8 |
| 3,144,006 | 8/1964 | Meurer _____ 123—8 |

FOREIGN PATENTS 1,270,694   7/1961   France.

OTHER REFERENCES

Wankel et al.: Bauart und gegenwartiger Entwicklungsstand einer Trochoiden-Rotationekolbenmaschine. Pages 33–45, February 1960.

SAMUEL LEVINE, *Primary Examiner.*

JOSEPH H. BRANSON, JR., KARL J. ALBRECHT,
*Examiners.*

F. T. SADLER, *Assistant Examiner.*